Patented Dec. 5, 1950

2,532,312

UNITED STATES PATENT OFFICE 2,532,312

HYDROGENATION OF DICYANOBUTENE TO ADIPONITRILE

Llewellyn E. Romilly, Wilmington, Del., assignor to E. I. du Pont de Nemours & Company, Wilmington, Del., a corporation of Delaware No Drawing. Application July 7, 1948, Serial No. 37,511

12 Claims. (Cl. 260—465.8)

This invention relates to a catalytic process for hydrogenating dicyanobutene to adiponitrile.

It is known that adiponitrile may be prepared by the catalytic dehydration of adipic acid-ammonia mixtures over dehydration catalysts. Although this process is very satisfactory, with the expanding demand for both adiponitrile and adipic acid it has become increasingly important that alternative routes to adiponitrile be developed which are independent of adipic acid.

It is therefore an object of this invention to prepare adiponitrile from a raw material other than adipic acid. It is a further object of this invention to provide a simple method for preparing adiponitrile by selective hydrogenation of 1,4-dicyanobutenes, which in turn are readily obtainable from butadiene. Another object of the invention is to prepare adiponitrile in good yields by selective hydrogenation of either 1,4-dicyano-2-butene or 1,4-dicyano-1-butene. Other objects of the invention will appear hereinafter.

According to this invention, adiponitrile is prepared by the liquid-phase hydrogenation of a 1,4-dicyanobutene at a temperature of from 25° to 200° C. in the presence of a palladium catalyst. According to a preferred embodiment of the invention, a solution of a 1,4-dicyanobutene in a solvent such as methanol is continuously passed, together with from 25 to 50 moles of hydrogen per mole of dicyanobutene, over a palladium-on-charcoal catalyst at a pressure of from 200 to 500 pounds per square inch gauge, at a temperature of from 75° to 150° C., and at a space velocity of from 0.3 to 0.6 volume of 1,4-dicyanobutene per volume of catalyst per hour.

The optimum temperatures for carrying out the process of this invention are dependent, to a certain extent, upon the other reaction conditions chosen. When using certain solvents such as, for example, adiponitrile itself, relatively high temperatures may be necessary, whereas with solvents such as the lower alcohols, it is possible to obtain excellent results at temperatures as low as 25° C. It is preferable to employ higher temperatures, i. e., from 75° to 150° C., in order to obtain optimum conversions of dicyanobutene to adiponitrile as well as optimum reaction rates.

In general it is preferred to employ pressures within the range of from 200 to 500 pounds per square inch gauge. Higher pressures may be employed if desired, but little commercial advantage results therefrom. Pressures as low as atmospheric may also be employed and comparatively low pressures may be particularly advantageous when operating at relatively low space velocities.

A large number of substances may be employed advantageously as solvents in the hydrogenation process of this invention, or, on the other hand the process may be carried out in the absence of a solvent. As examples of suitable solvents there may be mentioned water; the lower alcohols such as methanol, ethanol, propanol, isopropanol and the like; low-boiling ethers such as dimethyl ether and diethyl ether; nitriles such as acetonitrile, propionitrile and adiponitrile; hydrocarbons such as benzene, toluene, xylene, cyclohexane, hexanes and the like, etc. The preferred solvent is methanol which may contain from 3% to 6% by weight of the dicyanobutene to be hydrogenated. Under certain circumstances, it may be advantageous to employ solutions containing 20% or even 50% of the dicyanobutene in a solvent such as methanol.

Mole ratios of at least twice the stoichiometric requirement of one mole of hydrogen per mole of 1,4-dicyanobutene are generally employed in order to insure complete saturation of the olefinic bond, although the invention is operative with any mole ratio which exceeds the stoichiometric requirement. Since the palladium catalysts are highly selective, there is no danger of hydrogenating the nitrile groups. It is therefore possible to obtain practically quantitative conversions to adiponitrile when employing from 25 to 50 moles of hydrogen per mole of dicyanobutene. The conversions are independent of the mole ratios of reactants within this preferred range.

Catalysts suitable for the process of the invention may be prepared in a number of different ways. The prime requisite is that the catalysts comprise palladium. The catalyst may be prepared with the palladium in a metallic form, or, if desired, palladium compounds such as the oxide, chloride, nitrate, etc., may be employed, which compounds, under the reaction conditions, may be reduced to metallic palladium. The catalysts may be either unsupported, or else supported on inert base materials. In general, catalyst supports such as calcium carbonate, gamma alumina, tabular alumina, charcoal, silica gel, silica-alumina gels, firebrick, ion-exchange zeolites, kieselguhr, various clays and the like are employed. The preferred catalyst support is activated coconut charcoal which has been pre-extracted with an acid such as nitric acid. An acid extraction of this type makes possible the preparation of charcoal-supported catalysts of outstanding activity and uniformity.

The palladium catalysts may be prepared by a number of satisfactory procedures. One method comprises saturating the support with a hot solution of palladium chloride, evaporating to dryness on a steam bath, drying at 105° to 110° C., and reducing in hydrogen at 200° C. According to a second method, the support is evacuated and heated to 400° C., cooled in vacuo, and impregnated with a solution of palladium chloride, followed by drying and reducing as described above. Other palladium salts, such as the nitrate or the sulfate, may be used in place of the chloride, and other reducing agents may be substituted for hydrogen. When formaldehyde is employed as the reducing agent, the palladim is deposited on the support as a semi-lustrous metallic coating rather than in the black amorphous form which results from hydrogen reduction at 200° C. Effective pre-reduction of the catalyst is an extremely important factor in obtaining good catalyst activity, apparently because it results in a catalyst having a large surface area. Pre-extraction of the catalyst support is also important, apparently for the same reason.

The dicyanobutenes used in the practice of this invention are 1,4-dicyano-1-butene and 1,4-dicyano-2-butene. The 1,4-dicyano-2-butene, which is a solid at room temperature, may be obtained, for instance, by cyanation of the dichlorobutenes resulting from the chlorination of butadiene-1,3. Methods for carrying out this cyanation are disclosed by G. M. Whitman in S. N. 768,283, filed August 12, 1947, now U. S. Patent 2,477,674, by J. R. Johnson and G. M. Whitman in S. N. 768,284 filed August 12, 1947, now U. S. Patent 2,477,617, and by I. D. Webb and G. E. Tabet in S. N. 745,236 filed May 1, 1947, now U. S. Patent 2,477,672. The 1,4-dicyano-1-butene may be obtained, for instance, by isomerizing 1,4-dicyano-2-butene according to the method proposed by G. F. Hager in S. N. 756,097 filed June 20, 1947, now U. S. Patent 2,451,386.

The process of this invention may be conducted batchwise or continuously. In a continuous process the reactants may be passed upward, downward or in any other suitable direction over the catalyst. Space velocities of the order of 0.3 to 0.6 volume of dicyanobutene per volume of catalyst per hour have been found most satisfactory, but these limits can be varied within very wide ranges.

An important feature of the catalysts of this invention is that they may be regenerated a number of times without evidencing any decrease in activity. One method for regenerating the catalysts involves passing a stream of hydrogen over them at a temperature of from 350° to 650° C. for a period of from one hour up to 20 hours or more. Another method for regenerating the catalysts involves heating them in a mixture of nitrogen and air at a temperature of from 200° to 300° C. until the initial strongly exothermic reaction is complete.

The following examples will illustrate certain embodiments of the invention.

*Example 1.*—A slurry of 50 parts of 1,4-dicyano-2-butene in 150 parts of methanol is placed in a shaker tube with 10 parts of palladium-on-charcoal catalyst containing about 5% of palladium. The reactants are maintained at about 30° to 40° C. under a pressure of about 400 pounds per square inch of hydrogen for a period of 10 minutes. The conversion of dicyanobutene is quantitative and the yield of adiponitrile is about 90%. The quality of the adiponitrile prepared is very high.

*Example 2.*—A slurry of 25 parts of 1,4-dicyano-2-butene in 100 parts of benzene is placed in a shaker tube with 15 parts of palladium-on-charcoal catalyst and maintained at a temperature of from 30° to 55° C. for 30 minutes under a hydrogen pressure of from 200 to 500 pounds per square inch gauge. The conversion of dicyanobutene is about 95%, and the yield of adiponitrile is quantitative.

*Example 3.*—A process similar to that of Example 2 is carried out except that water is employed in place of benzene, and the heating is continued for an hour. The conversion of dicyanobutene is quantitative, and the yield of adiponitrile is about 92%.

*Example 4.*—50 parts of 1,4-dicyano-2-butene is dissolved in 50 parts of adiponitrile and placed in a shaker tube with 5 parts of palladium-on-charcoal catalyst. The reactants are heated to a temperature of 100° to 120° C. under a pressure of from 200 to 500 pounds per square inch gauge for a period of 5 hours. The conversion of dicyanobutene is 95%, and the yield of adiponitrile is 92%.

*Example 5.*—A 5% solution of 1,4-dicyano-2-butene in methanol is continuously passed over a palladium-on-calcium carbonate catalyst together with 50 moles of hydrogen per mole of dicyanobutene. The pressure is maintained at about 400 pounds per square inch, and the temperature at about 80° C. over a period of 24 hours. The conversion of dicyanobutene averages about 97%, and the product contains about 3% of tars. The adiponitrile, which is recovered by a simple distillation process, has a refractive index, $n_D^{25°C}$, of 1.4367. When operating at somewhat lower temperature, for instance about 60° C., somewhat lower conversions are generally obtained.

*Example 6.*—A 5% solution of 1,4-dicyano-2-butene in methanol is continuously passed over a palladium-on-gamma alumina catalyst together with about 50 moles of hydrogen per mole of dicyanobutene. The reactants are passed over the catalyst at a temperature of 80° C., at a pressure of 400 pounds per square inch, and at a space velocity of 0.4 volume of dicyanobutene per volume of catalyst per hour. The conversions of dicyano butene average 97% over a period of 135 hours, and the product contains only very small amounts of tars.

*Example 7.*—A process similar to that of Example 6 is carried out except that a 2% palladium-on-hard tabular alumina is employed as the catalyst, and the temperature is maintained at about 100° C. The results are equivalent to those of Example 6.

*Example 8.*—A 5% solution of 1,4-dicyano-2-butene in methanol is continuously passed over a catalyst prepared by depositing 2% of palladium on an acid extracted, activated charcoal carrier. At a temperature of 60° C., a pressure of 400 pounds per square inch gauge, and a space velocity of 0.4, conversions of 97% are obtained. After 160 hours of operation the flow of dicyanobutene is stopped and hydrogen at 500° C. is passed over the catalyst in place until no more sulfur is evolved. The regenerated catalyst is put back in operation and gives conversions averaging 97% during a period of 300 hours.

*Example 9.*—A 5% solution of 1,4-dicyano-2-butene in methanol is continuously passed upflow over a 2% palladium-on-activated charcoal catalyst at a pressure of 400 pounds per square inch gauge. The results obtained by varying the temperature from 115° to 150° C., and by varying the space velocity from 0.3 to 0.6 volume of dicyanobutene per volume of catalyst per hour, are set forth in the following table.

*Table*

| Space Velocity | Temp., °C. | Per cent conversion to Adiponitrile |
|---|---|---|
| 0.3 | 115 | 93 |
| 0.3 | 125 | 97 |
| 0.3 | 135 | 96–97 |
| 0.3 | 150 | 90 |
| 0.6 | 125 | 80 |
| 0.6 | 135 | 90 |
| 0.6 | 150 | 95 |

After 500 hours of operation under these varied conditions, the catalyst is regenerated by a method similar to that of Example 8. After regeneration, a 98% conversion was obtained at a temperature of 150° C., and a space velocity of 0.6.

*Example 10.*—A run similar to that shown in Example 9 is carried out using a pressure, however, of only 200 pounds per square inch gauge. The same excellent results are obtained, particularly if the space velocity is kept below about 0.5.

Although the examples disclose only the hydrogenation of 1,4-dicyano-2-butene, the process of this invention has been carried out equally satisfactory under the exact conditions exemplified, except that the isomeric compound, 1,4-dicyano-1-butene, was employed. For commercial purposes, it is often preferred to employ the latter isomer because it is a liquid at normal temperatures, whereas 1,4-dicyano-2-butene is a solid, and also because the 1,4-dicyano-1-butene isomer tends to be considerably more soluble in a number of solvents such as methanol. If desired, the solid compound may be isomerized to the liquid compound prior to carrying out the hydrogenation process of this invention.

The preferred palladium-on-charcoal catalysts are outstanding because they not only give high conversions at relatively low temperature, but they also give excellent yields throughout their entire life. It is interesting that these catalysts seem to go through an initial aging period during which their activity actually increases compared to that which they exhibit when freshly prepared.

A number of other hydrogenation catalysts, including various ruthenium, nickel, cobalt, copper and other catalysts, have been tested under conditions comparable to those reported herein, but these other catalysts have not measured up to the palladium catalysts of the invention. The other catalysts are either less active or less selective or else they exhibit a short life as the result of becoming fouled, presumably by tar or polymer formation.

Apparatus suitable for carrying out this hydrogenation process may be constructed of any of the materials generally used in the art, including stainless steel, mild steel, silver-lined equipment, stoneware, glassware, and the like. The reaction is highly exothermic and the best results are obtained when the apparatus is designed for efficient heat removal.

Since many modifications of the process of this invention will occur to those skilled in the art, it is not intended that the invention should be limited in any way other than by the following claims.

I claim:

1. A process for preparing adiponitrile which comprises contacting a 1,4-dicyanobutene in the liquid phase at a temperature of from 25° to 200° C. with at least 1 mole of hydrogen per mole of 1,4-dicyanobutene in the presence of a palladium catalyst.

2. A process for preparing adiponitrile which comprises contacting 1,4-dicyano-2-butene in the liquid phase at a temperature of from 25° to 200° C. with at least 2 moles of hydrogen per mole of 1,4-dicyano-2-butene in the presence of a palladium catalyst.

3. A process for preparing adiponitrile which comprises contacting 1,4-dicyano-1-butene in the liquid phase at a temperature of from 25° to 200° C. with at least 2 moles of hydrogen per mole of 1,4-dicyano-1-butene in the presence of a palladium catalyst.

4. A process for preparing adiponitrile which comprises contacting a methanol solution of a 1,4-dicyanobutene at a temperature of from 25° to 200° C. with at least 2 moles of hydrogen per mole of 1,4-dicyanobutene in the presence of a palladium catalyst.

5. A process for preparing adiponitrile which comprises contacting a benzene solution of a 1,4-dicyanobutene at a temperature of from 25° to 200° C. with at least 2 moles of hydrogen per mole of 1,4-dicyanobutene in the presence of a palladium catalyst.

6. A process for preparing adiponitrile which comprises contacting a water solution of a 1,4-dicyanobutene at a temperature of from 25° to 200° C. with at least 2 moles of hydrogen per mole of 1,4-dicyanobutene in the presence of a palladium catalyst.

7. A process for preparing adiponitrile which comprises contacting a 1,4-dicyanobutene in the liquid phase at a pressure of from 200 to 500 lbs. per square inch gauge and at a temperature of from 25° to 200° C. with at least 2 moles of hydrogen per mole of 1,4-dicyanobutene in the presence of a palladium catalyst.

8. A process for preparing adiponitrile which comprises continuously passing a solution of a 1,4-dicyanobutene, together with at least 2 moles of hydrogen per mole of 1,4-dicyanobutene, over a palladium catalyst at a temperature of from 25° to 200° C., and at a space velocity of from 0.3 to 0.6 volume of 1,4-dicyanobutene per volume of catalyst per hour.

9. A process for preparing adiponitrile which comprises contacting a 1,4-dicyanobutene in the liquid phase at a temperature of from 25° to 200° C. with at least 2 moles of hydrogen per mole of 1,4-dicyanobutene in the presence of a palladium-on-charcoal catalyst.

10. A process for preparing adiponitrile which comprises contacting a 1,4-dicyanobutene in the liquid phase at a temperature of from 25° to 200° C. with at least 2 moles of hydrogen per mole of 1,4-dicyanobutene in the presence of a catalyst consisting of from 1% to 3% of palladium distributed on a carrier of activated charcoal which has been extracted with nitric acid prior to use.

11. A process for preparing adiponitrile which comprises continuously passing a methanol solution containing from 3% to 6% by weight of a 1,4-dicyanobutene, together with from 25 to 50 moles of hydrogen per mole of 1,4-dicyanobutene, in an upwardly direction over a palladium-on-charcoal catalyst at a pressure of from 200 to 500 lbs. per square inch gauge, at a temperature of from 75° to 150° C., and at a space velocity of from 0.3 to 0.6 volume of 1,4-dicyanobutene per volume of catalyst per hour, said catalyst consisting of from 1% to 3% of palladium distributed on a carrier of activated charcoal which has been extracted with nitric acid prior to use.

12. A process for preparing adiponitrile which comprises contacting a 1,4-dicyanobutene in the liquid phase at a temperature of from 75° to 150° C. with at least 2 moles of hydrogen per mole of 1,4-dicyanobutene in the presence of a palladium catalyst.

LLEWELLYN E. ROMILLY.

REFERENCES CITED

The following references are of record in the file of this patent:

UNITED STATES PATENTS

| Number | Name | Date |
|---|---|---|
| 2,176,018 | Cope et al. | Oct. 10, 1939 |
| 2,334,140 | Winans | Nov. 9, 1943 |
| 2,342,101 | Cass et al. | Feb. 22, 1944 |
| 2,448,755 | Zellner | Sept. 7, 1948 |

OTHER REFERENCES

Adkins, "Reactions of Hydrogen" (U. of Wis.), pp. 128–129 (1937).